US007918686B1

(12) United States Patent
Lin

(10) Patent No.: US 7,918,686 B1
(45) Date of Patent: Apr. 5, 2011

(54) SERVER WITH IMPROVED CONNECTING PORT

(75) Inventor: Tse-Min Lin, Sijhih (TW)

(73) Assignee: Lanner Electronic Inc., Taipei (TW)

( * ) Notice: Subject to any disclaimer, the term of this patent is extended or adjusted under 35 U.S.C. 154(b) by 0 days.

(21) Appl. No.: 12/649,283

(22) Filed: Dec. 29, 2009

(51) Int. Cl.
*H02B 1/01* (2006.01)

(52) U.S. Cl. .......................................................... 439/557

(58) Field of Classification Search .................. 439/557, 439/556, 558, 555, 554
See application file for complete search history.

(56) References Cited

U.S. PATENT DOCUMENTS 3,476,928 A * 11/1969 Greasley ....................... 362/549
4,124,267 A * 11/1978 Mines et al. .................. 439/553
4,168,874 A * 9/1979 Weidler et al. ................ 439/557
4,643,509 A * 2/1987 Hollyday et al. ........ 439/607.28
4,659,166 A * 4/1987 Morningstar et al. ........ 439/580
4,906,201 A * 3/1990 Young et al. .................. 439/108
5,618,196 A * 4/1997 Biswas ......................... 439/181
6,672,455 B2 * 1/2004 Belden et al. .............. 206/308.2
7,044,792 B1 * 5/2006 Chen et al. ............... 439/607.04
7,168,978 B1 * 1/2007 Trout et al. .................... 439/545
7,300,316 B1 * 11/2007 Chen et al. .................... 439/677
7,329,145 B2 * 2/2008 Yagome et al. ............... 439/556
7,387,003 B2 * 6/2008 Marszalek et al. ................ 70/58
7,553,188 B2 * 6/2009 Whiteman et al. ....... 439/607.01
2005/0268674 A1 * 12/2005 Marszalek et al. ................ 70/58

* cited by examiner

*Primary Examiner* — T C Patel
*Assistant Examiner* — Harshad C Patel
(74) *Attorney, Agent, or Firm* — Roger H. Chu

(57) ABSTRACT

A server with an improved connecting port is provided. The server comprises a casing, a fastening module and a connecting port. The fastening module is disposed in an internal receiving space of the casing and further comprises a fastening base plate with a first through hole, a first fastening plate with a second through hole, and a second fastening plate with a third through hole. The connecting port has two ends connected to two engaging wings, respectively. The connecting port is inserted into the first through hole, the second through hole, and the third through hole. The engaging wings are embedded in the second through hole and held by and between the fastening base plate and the second fastening plate.

8 Claims, 9 Drawing Sheets

SERVER WITH IMPROVED CONNECTING PORT

BACKGROUND OF THE INVENTION

1. Technical Field

The present invention relates to a structure of a server, and more particularly, to a server with an improved connecting port.

2. Description of Related Art

In recent years, servers are becoming more popular among users because of advancement of information technology and the wide use of networks. Basically, a server is a core computer that works in a network system to serve other computers therein, by providing drive-related and printing-related services for network users and allowing various resources in a network environment to be shared between different user ends.

As for a conventional server, its electronic components, such as a motherboard, a central processing unit, and at least a hard drive, are fixed in position to an internal receiving space in a casing by screws, and the opening of the casing is covered with a cover to prevent dust or foreign bodies from invading into the casing and damaging the electronic components.

Electrical connection, if any, between the different electronic components of the conventional server is effectuated by at least a connecting port and a connecting cable. The connecting port is fixed to a specific position inside the server, so as to enable efficient planning of the space inside the server and keep the connecting port and the connecting cable neat and tidy.

Referring to FIG. 1 and FIG. 2, there are shown perspective views of a conventional connecting port fastening structure viewed from two different angles. As shown in the drawings, a conventional server has a fastening wall A1 provided thereon with a penetrating hole A2, and a connecting port A3 is coupled to the penetrating hole A2 by penetrating the penetrating hole A2. The connecting port A3 has two opposing ends equipped with two engaging structures A4, A5, respectively. The two engaging structures A4, A5 enable the connecting port A3 to be engaged with the fastening wall A1 and thus fixed in position thereto. However, other than the engaging structures A4, A5, the connecting port A3 and the fastening wall A1 are not provided with any auxiliary structure for attaching the connecting port A3 to the fastening wall A1 firmly. Hence, the connecting port A3 is likely to shake, loosen, or even come off the fastening wall A1.

In view of the above drawbacks of the prior art, it is imperative to provide a server with an improved connecting port so as for the connecting port to be fixed in position to the server by an auxiliary component and demonstrate an enhanced degree of stable, secure connection.

BRIEF SUMMARY OF THE INVENTION

To address the aforesaid issue and goal, the inventor of the present invention conducts trials and makes modifications unyieldingly and brings imagination and creativity into full play based on the inventor's years of experience on the field related to servers. Eventually, the inventor hereby discloses a server with an improved connecting port according to the present invention.

It is a primary objective of the present invention to provide a server with an improved connecting port such that the connecting port is better fixed in position to the inside of the server.

Another objective of the present invention is to provide a server with an improved connecting port such that the connecting port is firmly fixed in position to a wall of a receiving chamber for receiving a removable electronic component.

A further objective of the present invention is to provide a server with an improved connecting port so as to reduce the cost incurred in using a connecting port auxiliary fastening structure.

Hence, the present invention provides a server with an improved connecting port, comprising:

a casing with an internal receiving space therein for receiving a plurality of electronic components required for the server;

a fastening module, comprising: a fastening base plate fixed to an inside of the internal receiving space of the casing and provided with a first through hole; a first fastening plate superimposed on the fastening base plate and provided with a second through hole corresponding in position to the first through hole, wherein the second through hole is wider than the first through hole; and a second fastening plate superimposed on the first fastening plate to thereby allow the first fastening plate to be sandwiched between the fastening base plate and the second fastening plate, the second fastening plate being provided with a third through hole corresponding in position to the first through hole and the second through hole, wherein the third through hole is as wide as the first through hole; and a connecting port configured for connection with a connecting unit of a specific electronic component and provided with at least two engaging wings connected to two ends of the connecting port, respectively, wherein the connecting port is inserted into the first through hole, the second through hole, and the third through hole, and two said engaging wings are embedded in the second through hole and held by and between the fastening base plate and the second fastening plate.

DETAILED DESCRIPTION OF THE INVENTION

To achieve the above and other objectives and functions, the inventor of the present invention improves a fastening structure of a connecting port, integrates the improved fastening structure of the connecting port into a fastening module, makes corrections and adjustments repeatedly, and finalizes a server with an improved connecting port of the present invention. The structural features of present invention are described in detail hereunder by reference to a server with an improved connecting port in a first preferred embodiment and a second preferred embodiment according to the present invention.

Figure 1:
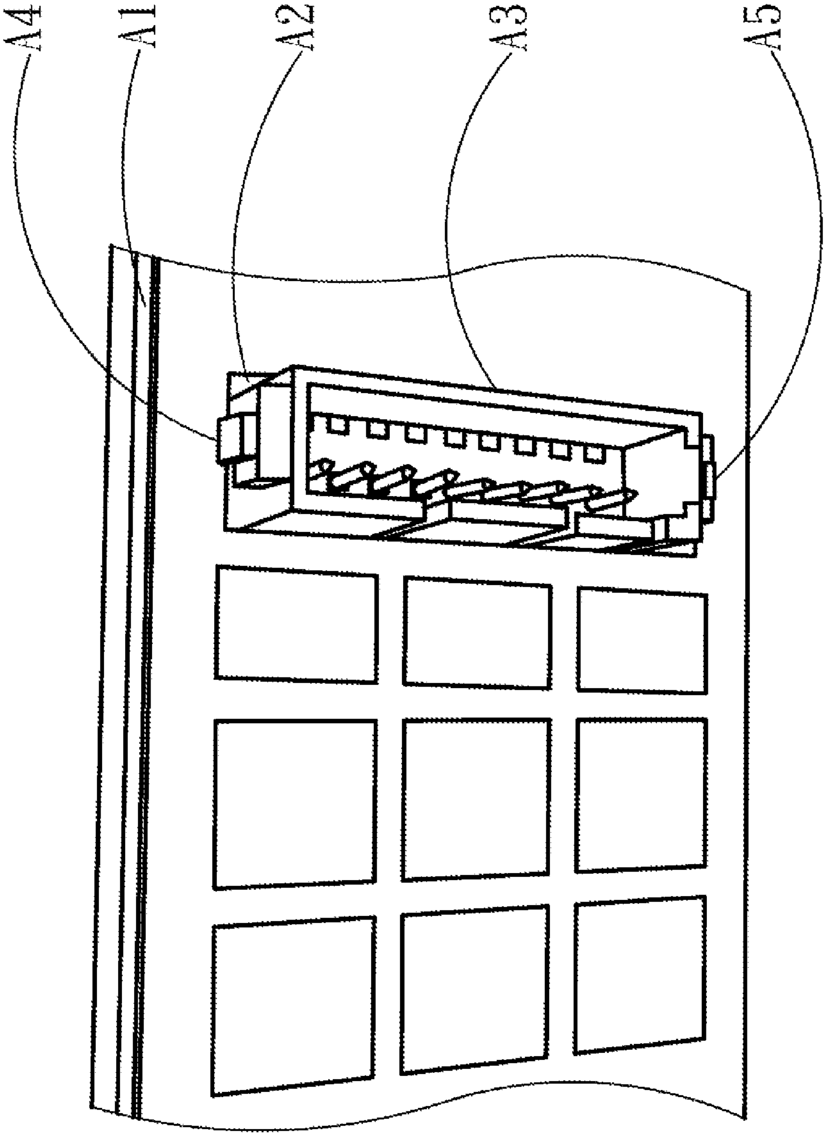
FIG. 1 is a perspective view of a conventional connecting port fastening structure.
Figure 2:
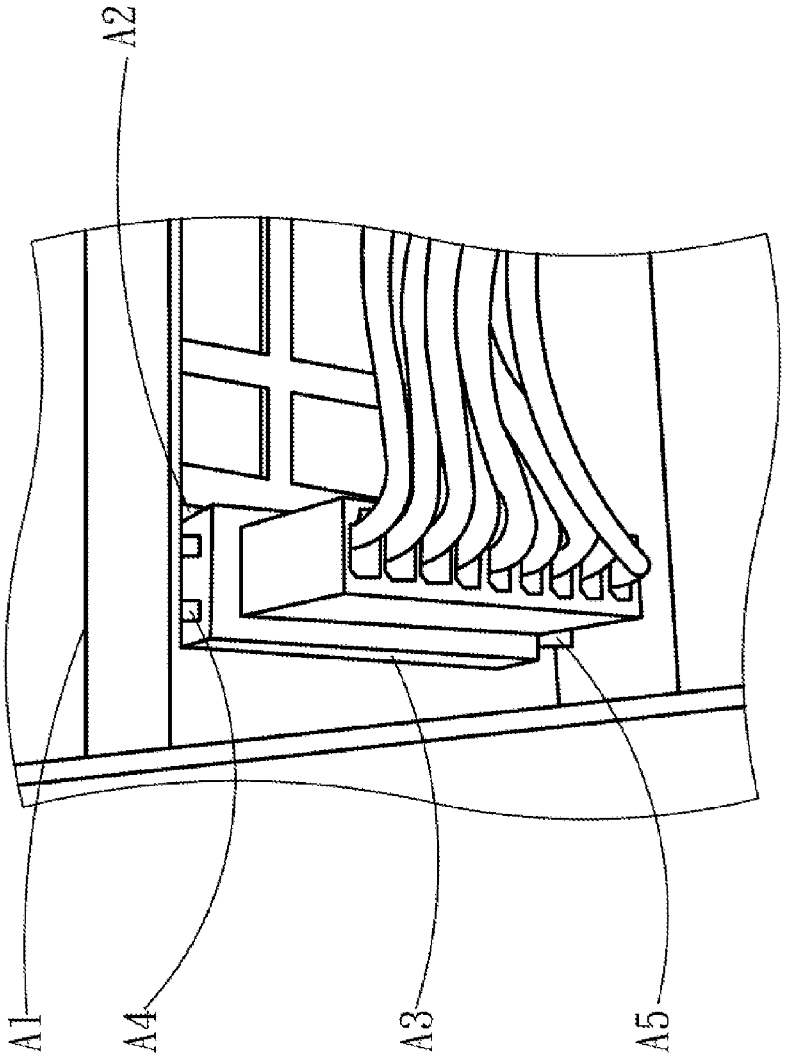
FIG. 2 is a perspective view of a conventional connecting port fastening structure viewed from another angle.
Figure 3:
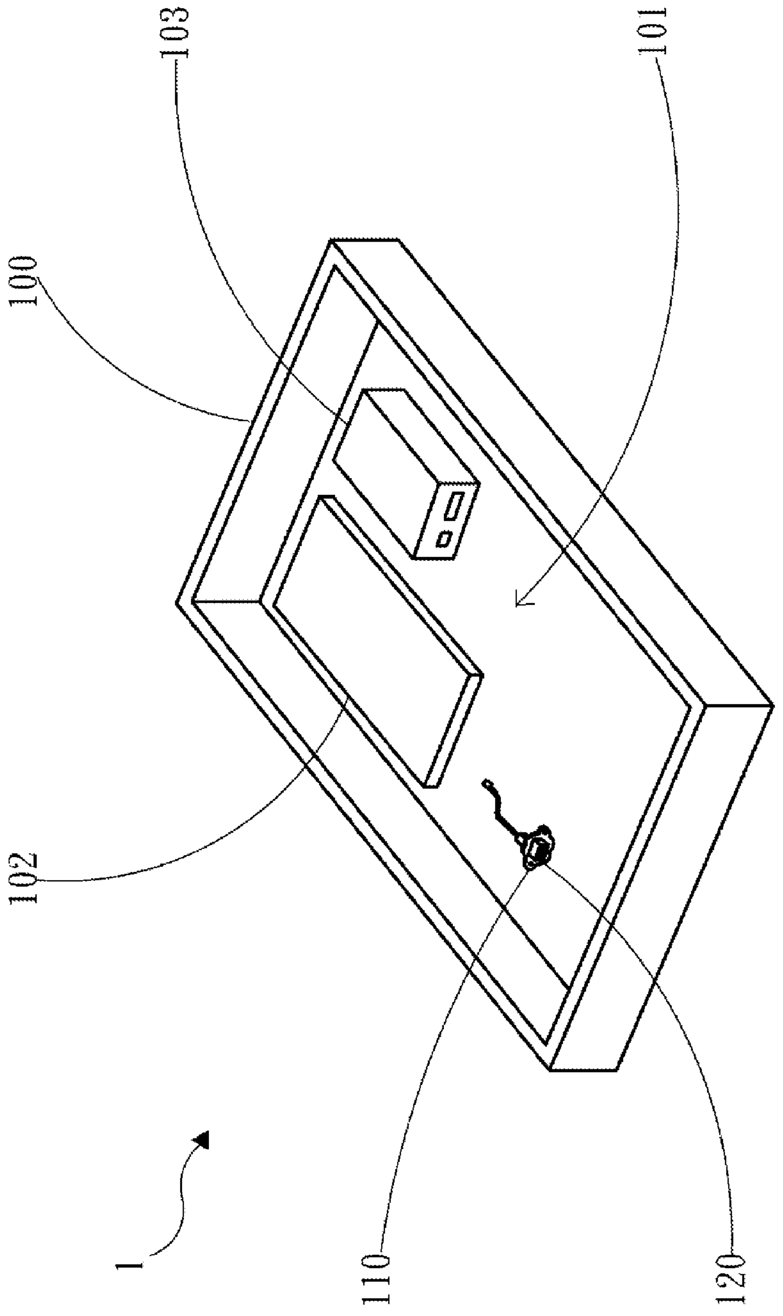
FIG. 3 is a perspective view of the inside of a server with an improved connecting port in a first preferred embodiment according to the present invention.

Referring to FIG. 3, there is shown a perspective view of the inside of a server 1 with an improved connecting port in a first preferred embodiment according to the present invention. As shown in the drawing, the server 1 comprises: a casing 100 with an internal receiving space 101 therein for receiving a plurality of electronic components required for the server 1, such as a motherboard 102 and a hard drive 103; a fastening module 110 disposed in the internal receiving space 101; and a connecting port 120 configured for connection with a connecting unit (not shown) of a specific electronic component.

Figure 4:
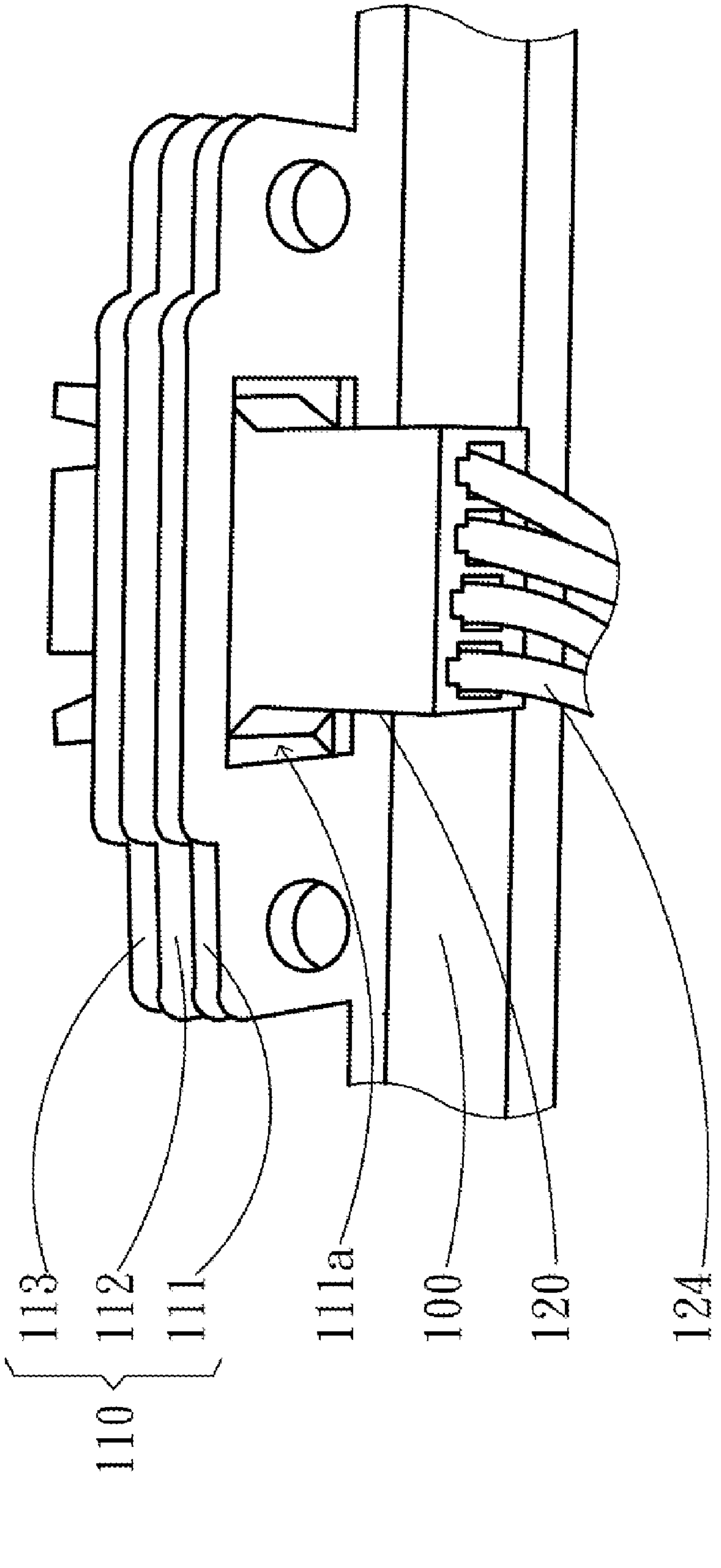
FIG. 4 is a perspective view of a connecting port coupled to a fastening module in the first preferred embodiment according to the present invention.
Figure 5:
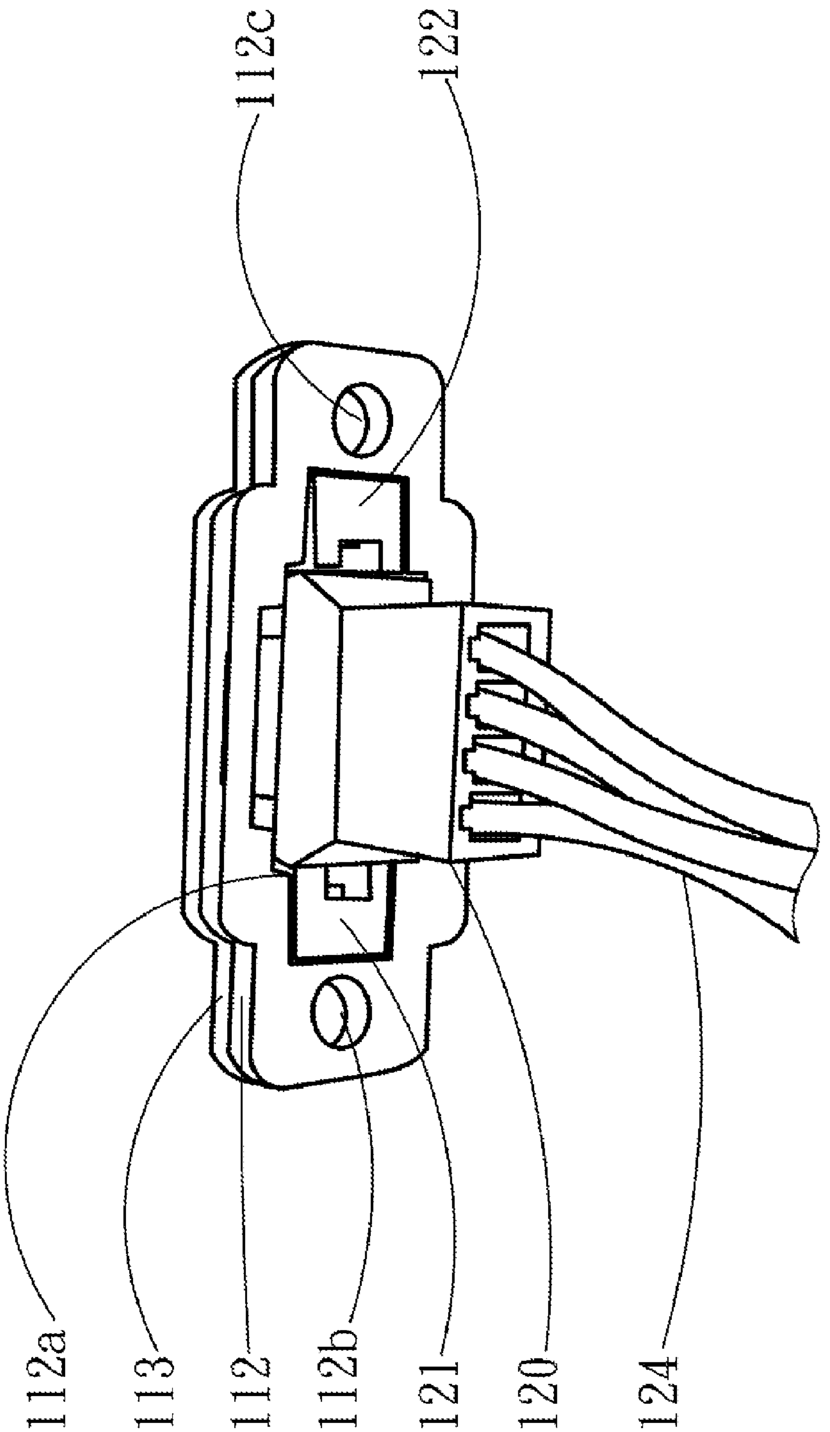
FIG. 5 is a perspective view of the connecting port coupled to a portion of the fastening module in the first preferred embodiment according to the present invention.
Figure 6:
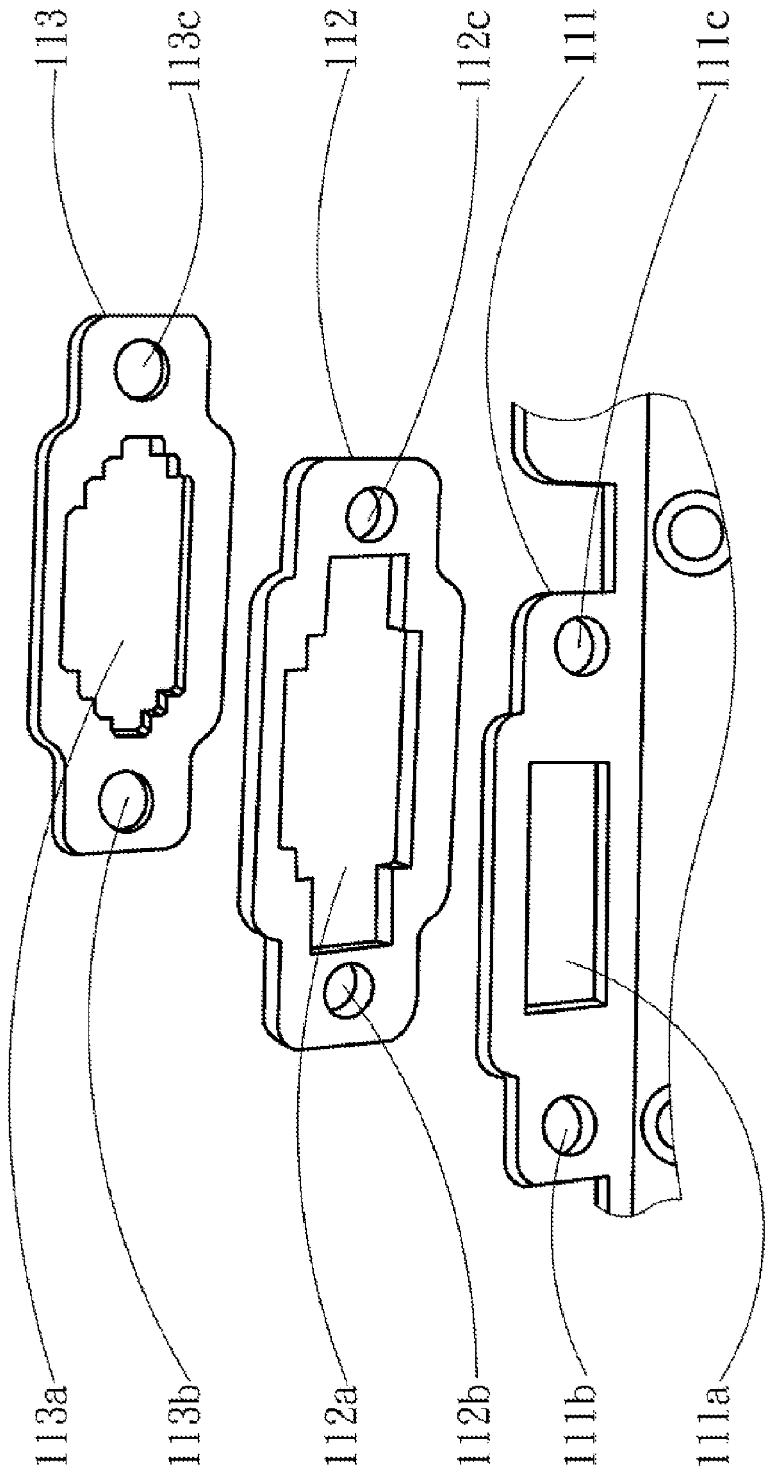
FIG. 6 is an exploded perspective view of the fastening module in the first preferred embodiment according to the present invention.
Figure 7:
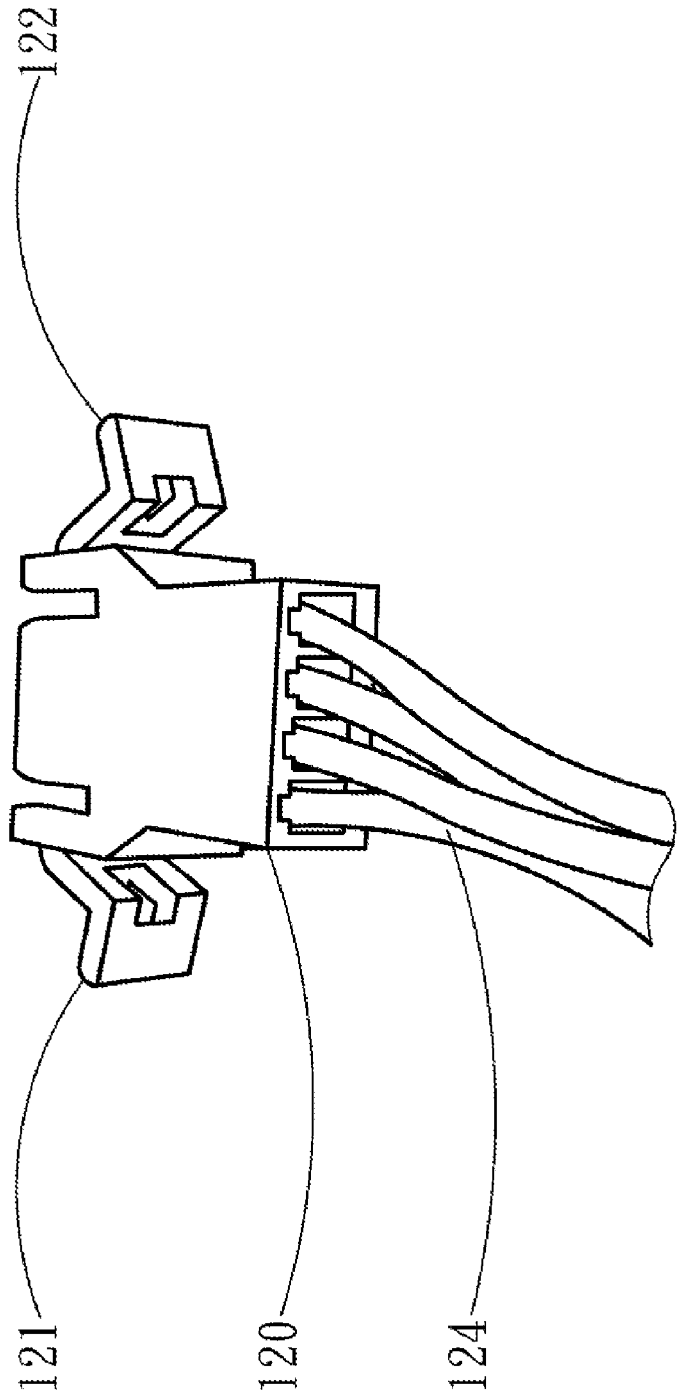
FIG. 7 is a perspective view of the connecting port in the first preferred embodiment according to the present invention.
Figure 8:
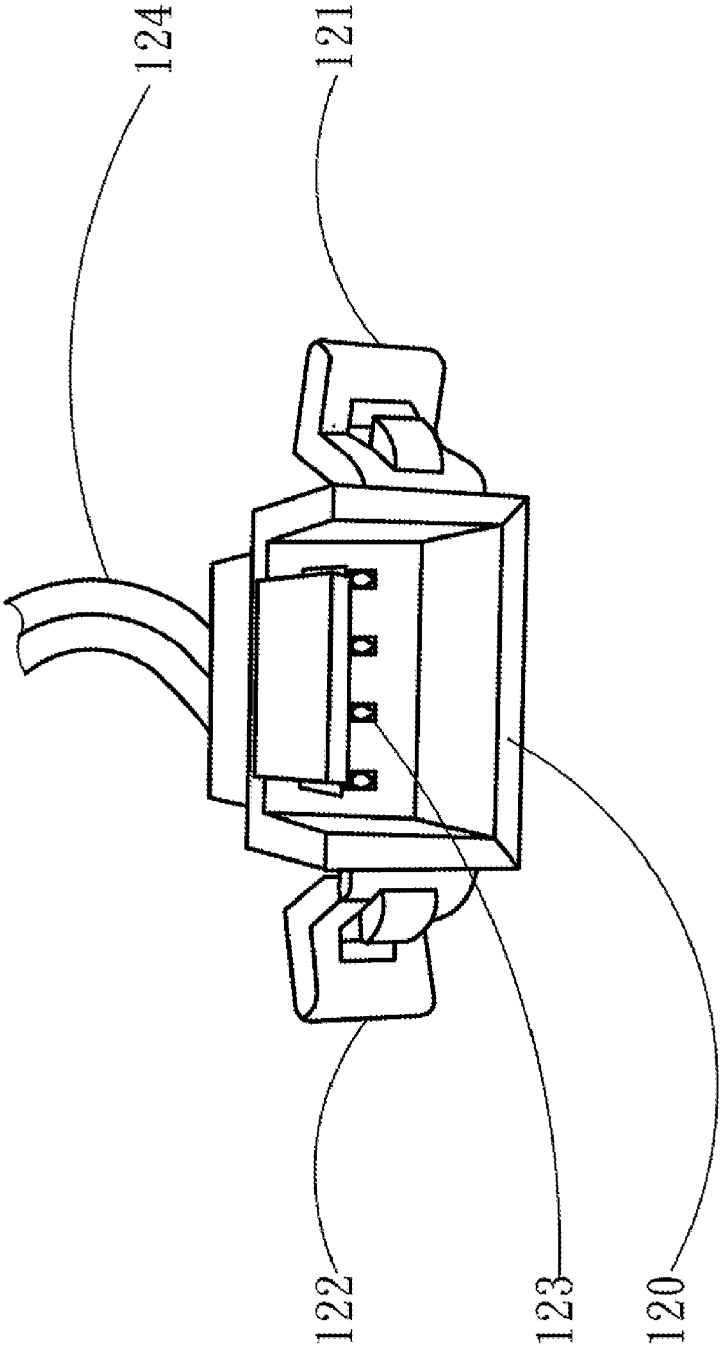
FIG. 8 is a perspective view of the connecting port viewed from another angle in the first preferred embodiment according to the present invention.

Referring to FIG. 4, there is shown a perspective view of the connecting port 120 coupled to the fastening module 110 in the first preferred embodiment according to the present invention. Referring to FIG. 5, there is shown a perspective view of the connecting port 120 coupled to a portion of the fastening module 110 in the first preferred embodiment according to the present invention. Referring to FIG. 6, there is shown an exploded perspective view of the fastening module 110 in the first preferred embodiment according to the present invention. Referring to FIG. 7, there is shown a perspective view of the connecting port 120 in the first preferred embodiment according to the present invention. Referring to FIG. 8 is a perspective view of the connecting port 120 viewed from another angle in the first preferred embodiment according to the present invention.

As shown in the above drawings, the fastening module 110 further comprises a fastening base plate 111, a first fastening plate 112, and a second fastening plate 113. The fastening base plate 111 is fixed to the inside of the internal receiving space 101 of the casing 100 and provided with a first through hole 111*a*. The fastening base plate 111 and the casing 100 are integrally formed as a unitary structure. The first fastening plate 112 is superimposed on the fastening base plate 111. The first fastening plate 112 is provided with a second through hole 112*a* corresponding in position to the first through hole 111*a*. The second through hole 112*a* is wider than first through hole 111*a*. The second fastening plate 113 is superimposed on the first fastening plate 112 such that the first fastening plate 112 is sandwiched between the fastening base plate 111 and the second fastening plate 113. The second fastening plate 113 is provided with a third through hole 113*a* corresponding in position to the first through hole 111*a* and the second through hole 112*a*. The third through hole 113*a* is as wide as the first through hole 111*a*. The fastening base plate 111 is further provided with two penetrating screw holes 111*b*, 111*c* which flank the first through hole 111*a*. The first fastening plate 112 is further provided with two penetrating screw holes 112*b*, 112*c* which flank the second through hole 112*a*. The second fastening plate 113 is further provided with two penetrating screw holes 113*b*, 113*c* which flank the third through hole 113*a*. The screw holes 111*b*, 112*b*, and 113*b* correspond in position to each other while the screw holes 111*c*, 112*c*, and 113*c* also correspond in position to each other. With the screw holes 111*b*, 111*c*, 112*b*, 112*c*, 113*b*, and 113*c* and screws (not shown), the fastening base plate 111, the first fastening plate 112, and the second fastening plate 113 are screwedly coupled together.

The connecting port 120 is provided with two engaging wings 121, 122 connected to two ends of the connecting port 120, respectively. A plurality of connecting terminals 123 are connected to one end of the connecting port 120. A plurality of connecting cables 124 are connected to the other end of the connecting port 120 and thus are opposite to the plurality of connecting terminals 123. The connecting port 120 can be connected to a power supply (not shown) via the plurality of connecting cables 124 so as to supply power to a specific electronic component (not shown).

In the first preferred embodiment, the connecting port 120 is inserted into the first through hole 111*a*, the second through hole 112*a*, and the third through hole 113*a*, and the engaging wings 121, 122 are embedded in the second through hole 112*a* (as shown in FIG. 5) and held by and between the fastening base plate 111 and the second fastening plate 113.

As regards the server 1 in the first preferred embodiment, the connecting port 120 is mounted on the fastening module 110 by following the steps of: passing the connecting cables 124 of the connecting port 120 through the first through hole 111*a* of the fastening base plate 111; pressing the engaging wings 121, 122 of the connecting port 120 against the fastening base plate 111; moving the first fastening plate 112 toward the connecting port 120 until the connecting port 120 penetrates the second through hole 112*a* of the first fastening plate 112 to thereby allow the second through hole 112*a* to be engaged with the engaging wings 121, 122; moving the second fastening plate 113 toward the connecting port 120 until the connecting port 120 penetrates the third through hole 113*a* of the second fastening plate 113 to thereby allow the engaging wings 121, 122 to be held by and between the second fastening plate 113 and the fastening base plate 111; and fastening the fastening base plate 111, the first fastening plate 112, and the second fastening plate 113 together by two screws (not shown) so as for the connecting port 120 to be firmly inserted into the fastening module 110. The connecting port 120 can be removed from the fastening module 110 by following the above steps reversely.

Figure 9:
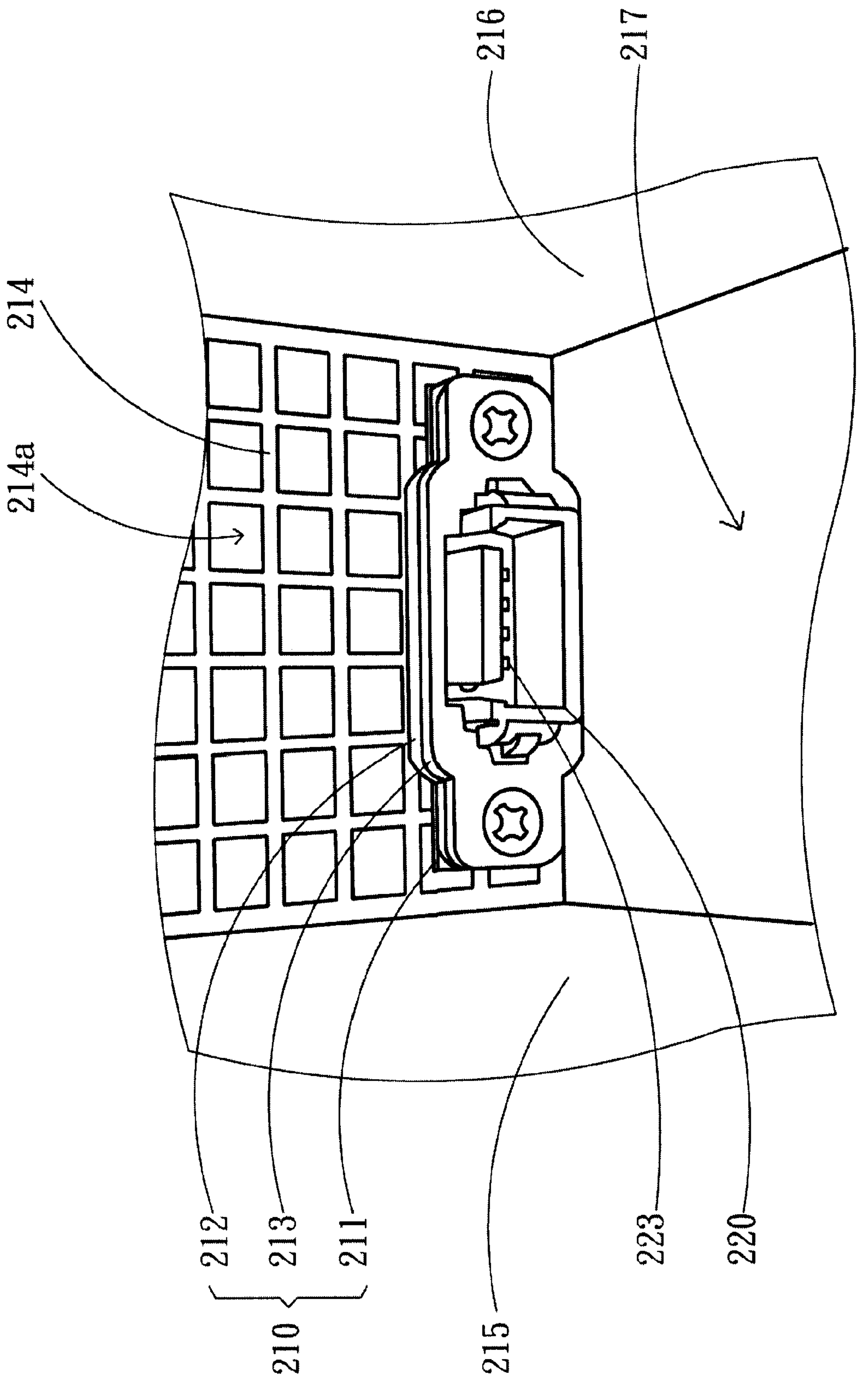
FIG. 9 is a perspective view of a connecting port coupled to a fastening module in a second preferred embodiment according to the present invention.

Referring to FIG. 9, there is shown a perspective view of a connecting port 220 coupled to a fastening module 210 in a second preferred embodiment according to the present invention. As shown in the drawing, a fastening base plate 211 of the fastening module 210 is fixed in position to an extending wall 214 extending away therefrom. Two fastening sidewalls 215, 216 are connected perpendicularly to two opposing edges of the extending wall 214, respectively. The extending wall 214 and the two fastening sidewalls 215, 216 together define and enclose a receiving chamber 217 for receiving a specific electronic component (not shown). The extending wall 214 is provided thereon with a plurality of air holes 214*a* configured for passage of air and ventilation. The connecting port 220 in the second preferred embodiment is structurally the same as the connecting port 120 in the first preferred embodiment and thus is not repeatedly described herein. In the second preferred embodiment, one end of the connecting port 220 faces the receiving chamber 217 and is provided with a plurality of connecting terminals 223. However, in practice, the orientation of the connecting port 220 may vary as needed; for example, it depends on the framework of a server.

The above detailed description of the framework and features of the present invention can be summarized in terms of the advantages of the present invention as follows:

1. The present invention provides the server with the connecting port that features improved structure and works in conjunction with the fastening module so as to be better fixed in position to the inside of the server and free from drawbacks of the prior art, that is, connecting ports of conventional servers are likely to shake, loosen, or even be disconnected.

2. The present invention provides the server with the connecting port flexibly receivable in various receiving spaces and connectable to various electronic components to thereby enhance diversity of use.

3. The present invention provides the server with the connecting port firmly held by components simpler and cheaper than conventional components to thereby reduce costs.

The foregoing embodiments are provided to illustrate and disclose the technical principles and features of the present invention so as to enable persons skilled in the art to understand the disclosure of the present invention and implement the present invention accordingly, and are not intended to be restrictive of the scope of the present invention. Hence, all equivalent modifications and variations made to the foregoing embodiments without departing from the spirit and principles in the disclosure of the present invention should fall within the scope of the invention as set forth in the appended claims.

What is claimed is:

1. A server with an improved connecting port, the server comprising:

a casing with an internal receiving space therein for receiving a plurality of electronic components required for the server;

a fastening module, comprising:

a fastening base plate fixed to an inside of the internal receiving space of the casing and provided with a first through hole;

a first fastening plate superimposed on the fastening base plate and provided with a second through hole corresponding in position to the first through hole, wherein the second through hole is wider than the first through hole; and a second fastening plate superimposed on the first fastening plate to thereby allow the first fastening plate to be sandwiched between the fastening base plate and the second fastening plate, the second fastening plate being provided with a third through hole corresponding in position to the first through hole and the second through hole, wherein the third through hole is as wide as the first through hole; and a connecting port configured for connection with a connecting unit of a specific electronic component and provided with at least two engaging wings connected to two ends of the connecting port, respectively, wherein the connecting port is inserted into the first through hole, the second through hole, and the third through hole, and two said engaging wings are embedded in the second through hole and held by and between the fastening base plate and the second fastening plate.

2. The server of claim 1, wherein the fastening base plate and the casing are integrally formed as a unitary structure.

3. The server of claim 1, wherein the fastening base plate, the first fastening plate, and the second fastening plate are each provided with at least a penetrating screw hole at a corresponding position to thereby be coupled together by means of screws.

4. The server of claim 1, wherein the connecting port is further provided with a plurality of connecting terminals connected to an end of the connecting port.

5. The server of claim 4, wherein the connecting port is further provided with a plurality of connecting cables connected to an opposing end of the connecting port and thus opposite to the plurality of connecting terminals.

6. The server of claim 5, wherein the connecting port is connected to a power supply via the plurality of connecting cables so as to supply power to the specific electronic component.

7. The server of claim 1, wherein the fastening base plate is fixed in position to an extending wall extending away therefrom, and fastening sidewalls are connected perpendicularly to two opposing edges of the extending wall, respectively, to allow the extending wall and two said fastening sidewalls to define and enclose a receiving chamber for receiving the specific electronic component.

8. The server of claim 7, wherein the extending wall is provided thereon with a plurality of air holes configured for passage of air and ventilation.

* * * * *